J. KIEWICZ.
STOP MOTION.
APPLICATION FILED AUG. 7, 1916.
1,285,222.
Patented Nov. 19, 1918.
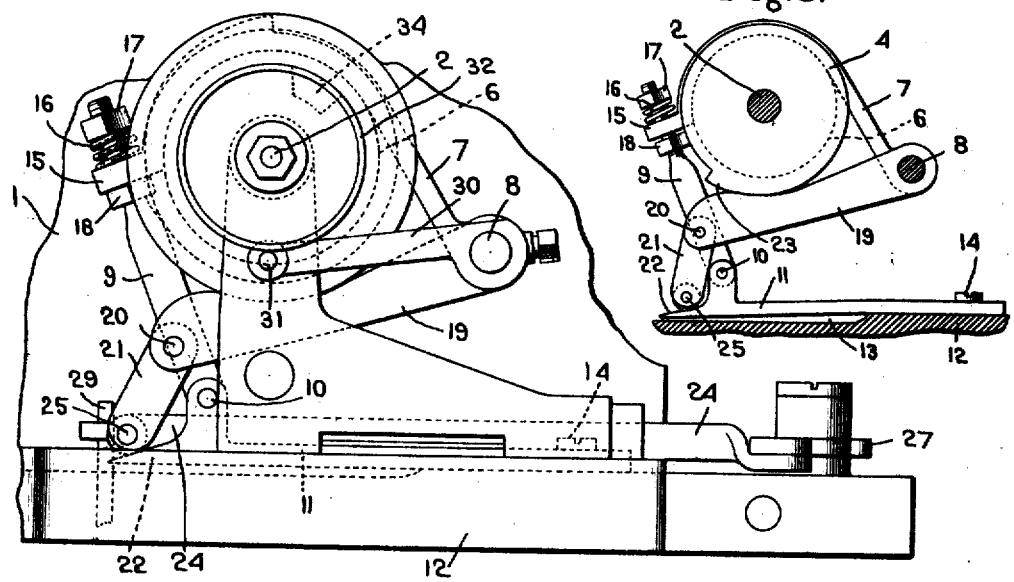
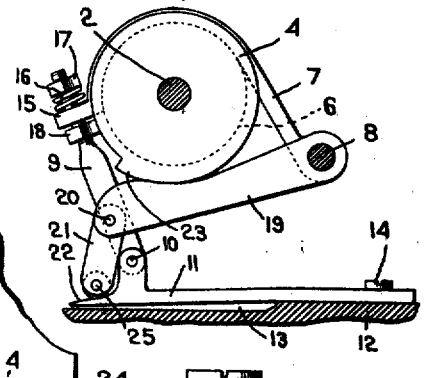
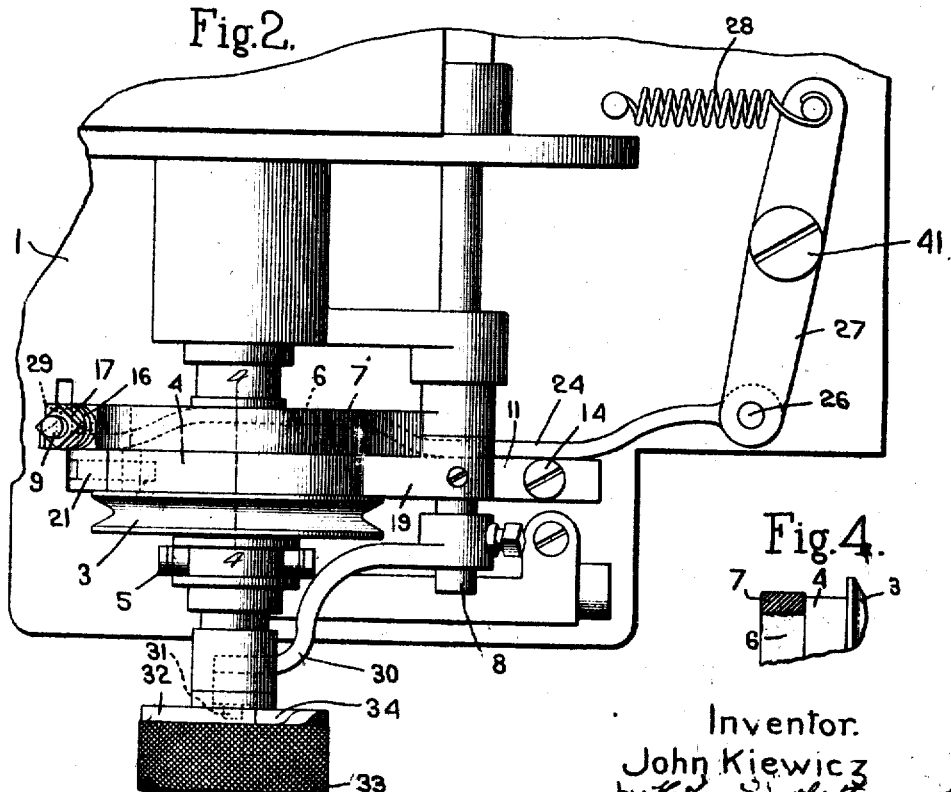
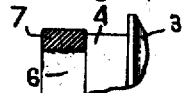
Inventor.
John Kiewicz
by Kerr Smith & Tennant
Attys.

UNITED STATES PATENT OFFICE.

JOHN KIEWICZ, OF BOSTON, MASSACHUSETTS, ASSIGNOR TO THE REECE BUTTON HOLE MACHINE COMPANY, OF BOSTON, MASSACHUSETTS, A CORPORATION OF MAINE.

STOP-MOTION.

1,285,222.   Specification of Letters Patent.   Patented Nov. 19, 1918.

Application filed August 7, 1916. Serial No. 113,445.

*To all whom it may concern:*

Be it known that I, JOHN KIEWICZ, a citizen of the United States, residing at Boston, county of Suffolk, State of Massachusetts, have invented an Improvement in Stop-Motions, of which the following description, in connection with the accompanying drawing, is a specification, like characters on the drawing representing like parts.

This invention relates to stop motions such as are used in connection with machines of various types for bringing the parts to rest when the driving clutch or other driving element is disengaged, and the objects of the invention are to provide an improved stop motion which is noiseless in its operation and which brings the driven element to rest with an easy cushioned movement and without any sudden jar or shock, and also to provide a novel stop motion which is positive in its operation and will accurately bring the parts to rest always in a given predetermined position, and otherwise to improve stop motions, all as will be more fully hereinafter set forth.

In order to give an understanding of my invention, I have illustrated in the drawings a selected embodiment thereof which will now be described, after which the novel features will be pointed out in the appended claims.

In the drawings, Figure 1 is a side view of a stop motion embodying my invention;

Fig. 2 is a top plan view thereof;

Fig. 3 is a view similar to Fig. 1 showing the parts in operative position for bringing the driven element to rest;

Fig. 4 is a section on the line 4—4, Fig. 2.

My improved stop motion is adapted for use on various machines such as sewing machines, machines for making shoes, nailing machines, tacking machines, and in fact, on almost any machine where it is desirable to bring the parts to rest quickly and in a predetermined position when the driving clutch is disengaged.

I have not deemed it necessary to illustrate herein any complete machine, but have simply shown in the drawings a sufficient portion of a machine including the driving shaft thereof to illustrate how my invention may be applied to the machine.

1 indicates generally the machine with which my improved stop motion is used, and 2 is the driving shaft by which the operative parts of the machine are driven. This driving shaft is actuated from a driving pulley 3 which is loosely mounted on the shaft but is adapted to be clutched thereto or unclutched therefrom by any suitable clutch mechanism. In the present embodiment of my invention, the driving pulley 3 is one of the clutch elements, the other clutch element being indicated at 4. The clutch pulley 3 is the movable clutch element and it is moved into and out of clutching engagement with the clutch element 4 by means of a clutch actuator 5 of any suitable or usual construction. The parts thus far described are or may be of any usual construction and form no part of the present invention.

My improved stop motion is constructed to co-act with the driven element 2 to bring it to rest with a cushioned movement and without any shock or jar. Said stop motion comprises a brake drum rigid with the driven element 2, a brake member coöperating with said brake drum, an actuating member connected to the brake member and adapted to be moved into either operative or inoperative position, and when in operative position being adapted to be engaged by a cam on the driven member, which cam operates through the actuating member to apply the brake band to the brake drum. The construction and operation of the parts is such that when the actuating member is in its operative position, the brake drum with the stop cam element becomes wedged between the actuating member and the brake member and thus insures that the parts will be brought to rest at the proper point and with easy cushioned movement.

The brake drum is shown at 6 and it is herein illustrated as being formed on the clutch element 4. The brake member which coöperates with the brake drum is shown at 7, it being pivotally mounted at one end upon a stud or shaft 8, the other end of the brake member 7 having a link 9 connected thereto, said link being pivotally connected at 10 to a resilient plate or element 11 that is secured at one end to the bed plate 12 by any suitable means, such as a screw 14. The bed plate is provided with a depressed surface 13 underneath the opposite end of said resilient member 11. The connection between the link 9 and the brake member 7 is preferably a yielding one. Said brake member is shown as having a perforated ear 15 at its outer end through which the end of the link 9 extends. A spring 16 encircles the projecting end of the link 9 and is confined between the ear 15 and a nut 17 screw-threaded to the link 9.

The link 9 has a collar 18 thereon underneath the ear 15. When the member 11 is in its normal unflexed condition, it acts through the link 9 and collar 18 to hold the brake member 7 out of operative engagement with the brake drum 6. If, however, the member 11 is forced downwardly, as shown in Fig. 3, then the brake member will be drawn against the brake drum 6.

I have provided herein an actuating means which is normally inoperative, but which when operative acts to bend the free end of the member 11 downwardly and thereby apply the brake. This actuating means is in the form of a lever 19 fast on the shaft 8 and situated to engage the periphery of the clutch member 4. Said lever 19 has a strut member 21 pivotally connected to its free end at 20. The lower end of the strut member has engagement with the projecting portion 22 of the element 11. The normal or inoperative position of the actuating means is that shown in Fig. 1, in which position the strut member 21 is in its forward position which is inclined to the vertical. If the lower end of the strut member 21 is moved to the right, Fig. 1, into the position shown in Fig. 3, this operation will tend to separate the lever 19 from the member 11, the lever 19 being moved firmly against the periphery of the clutch element 4, and the member 11 being flexed or bent downwardly into the position shown in Fig. 3. This movement of the member 11 acts through the link 9 to apply the brake member 7 to the brake drum 6. The clutch member 4 is formed with a stop cam 23 and when the stop cam comes into engagement with the lever 19 at the time that the parts are in the position shown in Fig. 3, the tendency of said cam is to force the lever 19 downwardly, thereby acting through the strut 21, member 11 and link 9 to apply the brake 7 with greater force. The stop cam 23 presents a surface which is eccentric relative to the brake drum 6 and as the stop cam and brake drum are rigid with each other, the action of the stop cam in bringing the parts to rest is something of a wedging action, that is, said stop cam and brake drum become wedged between the lever 19 and the brake 7 and thus the parts will be brought to rest. The cam surface of the stop cam may be made with a gradual rise so that the parts will be brought to rest with an easy movement.

When the brake is to be disengaged, the lower end of the strut member 21 is moved forwardly into the position shown in Fig. 1, thereby allowing the member 11 to resume its normal position, which operation releases the brake from its frictional engagement with the brake drum 6.

Any suitable means may be employed for shifting the strut member 21 from its inoperative to its operative position. The means I have herein shown for this purpose comprises a link member 24, one end of which is pivotally connected to the lower end of the strut member 21, as shown at 25. The other end of the link 24 is pivotally connected at 26 to a lever 27 which is pivoted to the bed plate 12 at 41 and is acted upon by a suitable spring 28 that tends normally to turn the lever in a direction to move the link 24 to the right. The link is normally held in its inoperative position against the tension of the spring 28 by means of a suitable latch 29. The latch 29 will preferably be connected to and operated in unison with the clutch-actuating member 5 so that when the clutch actuator is operated to unclutch the driving pulley 3 from the clutch element 4, the latch 29 will be released simultaneously. As soon as this latch is released, the spring 28 will act through the lever 27 and link 24 to carry the strut 21 from its inoperative position shown in Fig. 1 to its operative position shown in Fig. 2, thus causing the brake to be applied and the driving element to be brought to rest, as above described. When the machine is to be started again, the lever 27 and link 24 may be returned to the position shown in Figs. 1 and 2 by any suitable means, thus releasing the brake so that when the pulley 3 is clutched to the clutch element 4, the machine may be started. The latch 29 will preferably be a spring-pressed latch so that it will automatically engage the link 24 when the latter is moved into the position shown in Fig. 1.

I have herein shown means similar to that illustrated in my Patent No. 1,234,772, granted July 31, 1917, for permitting the movement of the strut member 21 and lever 19 from their inoperative to their operative position only when the driving element is in a predetermined angular position, thus insuring that the driving element will always be brought to rest at the same point in its rotation. This means comprises an arm 30 fast on the rock shaft 8 and, therefore, rigid with the lever 19, which arm is provided with a projection 31 that normally engages the annular portion 32 formed on the head or hand piece 33 which is fast on the driving shaft 2. This head 33 is provided with the recess 34. As long as the projection 31 is in engagement with the surface 32, the rock shaft 8 and lever 19 will be held from turning movement and will be maintained in their inoperative position shown in Fig. 1, even though the latch 29 is released. When the recess 34 comes in line with the projection 31, however, then the arm 30 and lever 19 can move upwardly under the influence of the spring 28, provided, of course, the latch 29 is released, and such upward movement will operate to apply the brake and bring the parts to rest, as above described.

In order to bring the stop motion into action, the driving pulley 3 must be disengaged from the clutch and the latch 29 must be released. The stop motion will be held inoperative even when these operations are performed until the recess 34 comes opposite the pin or projection 31, at which time the spring 28 will act to move the strut member 21 to the right into the position shown in Fig. 3, thus applying the brake, and as the stop cam comes into engagement with the lever 19, the braking action is increased until it becomes sufficient to bring the parts to rest.

I claim:

1. In a stop motion, the combination with a driven member having a brake drum and stop cam rigid therewith, of a brake member anchored at one end and adapted to engage said drum, an actuating lever pivoted to swing toward and from the stop cam in a radial direction and by such movement to be carried from its inoperative position in which it is out of the path of the movement of said cam, into its operative position in which it is situated to be engaged by the stop cam, said lever and brake being situated on opposite sides of the brake drum, and a connection between said lever and said brake whereby the action of the stop cam against said lever will apply the brake.

2. In a stop motion, the combination with a driven member having a brake drum and stop cam adapted to engage said drum, an actuating lever pivoted to swing toward and from the stop cam in a radial direction and by such movement to be carried from its inoperative position in which it is out of the path of the movement of said cam, into its operative position in which it is situated to be engaged by the stop cam, said lever and brake being situated on opposite sides of the brake drum, and a connection between said lever and said brake whereby the action of the stop cam against said lever will apply the brake, said connection being situated on the opposite side of the brake drum from the anchored end of the brake member.

3. In a stop motion, the combination with a driven member having a brake drum and a stop cam rigid therewith, of a brake member coöperating with the brake drum, a resilient member to which the brake member is connected, an actuating lever, a strut member connected to the actuating lever and bearing against the resilient member, and means to move the strut member relative to the resilient member thereby to bring the brake into braking engagement with the brake drum and to move the actuating lever into position to be engaged by the stop cam.

4. In a stop motion, the combination with a driven member having a brake drum and a stop cam rigid therewith, of a brake partially encircling said drum, an actuating lever pivoted to swing about an axis parallel to the axis of rotation of the drum and situated on the opposite side of the drum from the brake, a strut member pivoted to the actuating lever, a member connected to the brake and having a wedging surface with which the strut member engages, and means to move said strut member on said wedging surface whereby the actuating lever will be forced against the stop cam and the latter will act through said lever and strut member to apply the brake.

5. In a stop motion, the combination with a driven member having a brake drum and a stop cam rigid therewith, of a brake member partially encircling said drum, an actuating lever pivoted to swing about an axis parallel to the axis of rotation of the drum, said brake member and actuating lever being situated on opposite sides of the drum, means to swing said lever about its pivot thereby to carry it into position to be engaged by the cam, and operative connections between said lever and brake whereby the cam-actuated movement of the lever will apply the brake.

6. In a stop motion, the combination with a driven member having a brake drum and a stop cam rigid therewith, of a brake coöperating with said brake drum, an actuating lever movable from its inoperative position to its operative position in which it is situated to be engaged by said stop cam, automatically-operative means tending to move said lever into its operative position, means to hold said lever in inoperative position except when the drum is in a predetermined position, and connections between said lever and brake whereby the action of the stop cam against the lever will apply the brake.

7. In a stop motion, the combination with a driven member having a brake drum and a stop cam rigid therewith, of a brake member coöperating with said brake drum, a brake-actuating lever situated on the opposite side of the driven member from the brake member, automatically-operative means to move said actuating lever from its inoperative position into its operative position in which it is situated to be acted upon by the stop cam, means to hold said lever in its inoperative position except when the drum is in a predetermined position, and connections between said lever and brake member by which the cam-actuated movement of said lever will apply the brake.

8. In a stop motion, the combination with a driven member having a brake drum and a stop cam rigid therewith, of a brake member coöperating with the brake drum, a movable element to which the brake member is connected, an actuating lever, a strut member connected to the actuating lever and bearing against said movable element, and means to move the strut member relative to the movable member thereby to move the actuating lever into position to be engaged by the stop cam and to cause the cam-actuated movement of the latter to apply the brake.

9. In a stop motion, the combination with a driven member having a brake drum and a stop cam rigid therewith, of a brake partially encircling said drum, an actuating lever pivoted to swing about an axis parallel to the axis of rotation of the drum and situated on the opposite side of the drum from the brake, a strut member pivoted to the actuating lever, a member connected to the brake and having a wedging surface with which the strut member engages, means to move said strut member on said wedging surface whereby the actuating lever will be forced against the stop cam and the latter will act through said lever and strut member to apply the brake, and means to prevent such movement of the strut member except when the driven member is in a predetermined angular position.

10. In a stop motion, the combination with a driven member having a brake drum and a stop cam rigid therewith, of a brake member anchored at one end and adapted to engage said drum, an actuating lever pivoted to swing toward and from the stop cam, said brake member and lever being situated on opposite sides of the drum, a yielding member connected to the brake member, a strut member connected to the actuating lever and bearing against the yielding member, and means to move the strut member relative to the yielding member whereby the actuating lever is moved into engagement with the stop cam and the brake member is moved into braking engagement with the brake drum.

11. In a stop motion, the combination with a driven member having a brake drum and a stop cam rigid therewith, of a brake member coöperating with the brake drum, an actuating lever pivoted to swing toward and from the stop cam and situated on the opposite side of the brake drum from the brake member, a resilient member connected to the brake member and having a wedging surface, a strut member pivoted to the actuating lever and engaging said surface, and means to move said strut member and said wedging surface thereby to apply the brake.

12. In a stop motion, the combination with a driven member having a brake drum and a stop cam rigid therewith, of a brake member coöperating with the brake drum, an actuating lever pivoted to swing toward and from the stop cam and situated on the opposite side of the brake drum from the brake member, a resilient member connected to the brake member and having a wedging surface, a strut member pivoted to the actuating lever and engaging said surface, means to move said strut member and said wedging surface thereby to apply the brake, an arm rigid with said actuating lever, and means coöperating with said arm to hold the actuating lever out of engagement with the stop cam except when the driven member is in a predetermined angular position.

In testimony whereof, I have signed my name to this specification.

JOHN KIEWICZ.